Oct. 20, 1953     A. LOWREY     2,655,984
POWER ACTUATED ADJUSTABLE TIRE DEMOUNTING BAR
Filed April 3, 1950     2 Sheets-Sheet 1
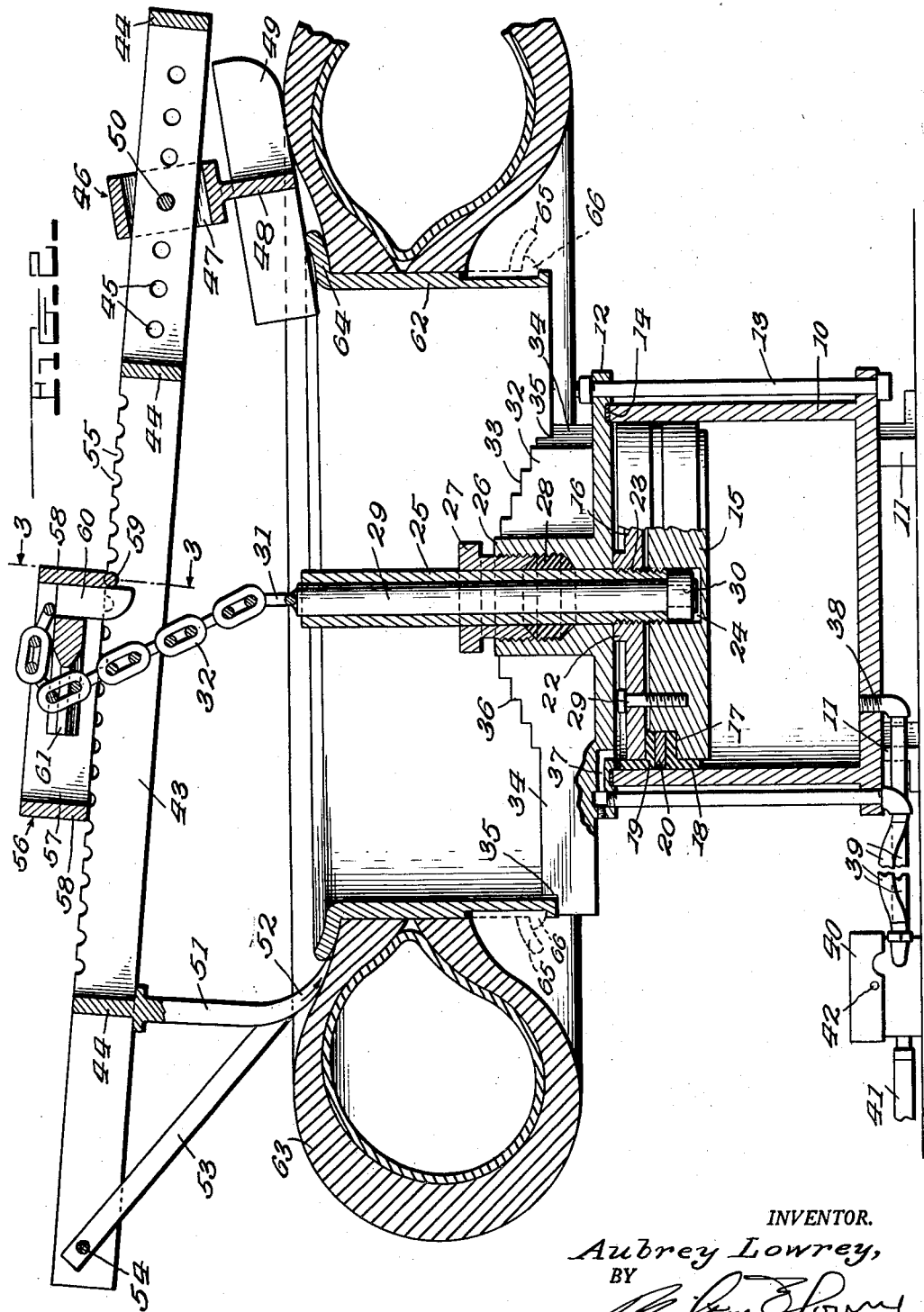
INVENTOR.
Aubrey Lowrey,
BY

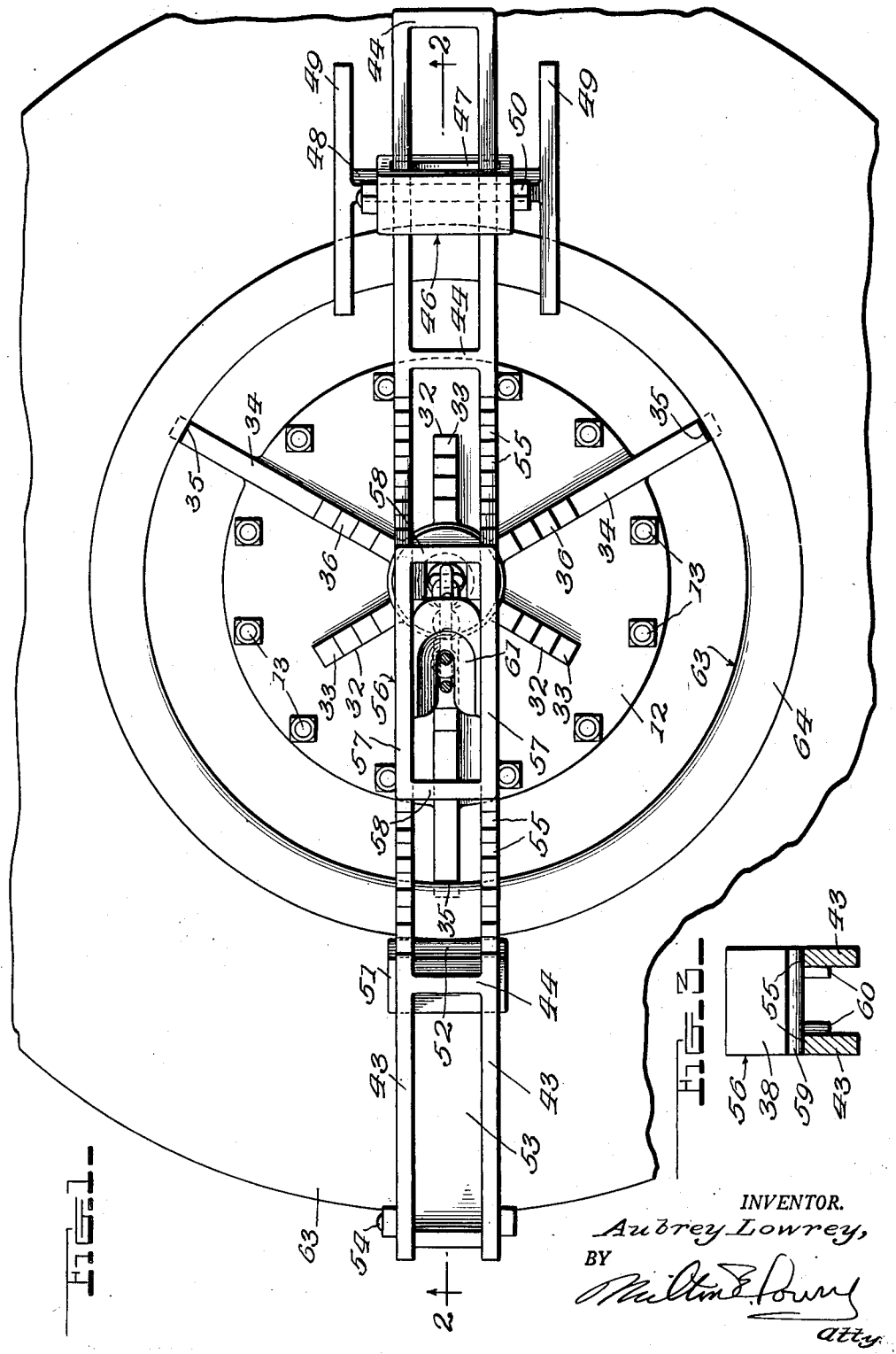

Patented Oct. 20, 1953

2,655,984

UNITED STATES PATENT OFFICE 2,655,984

POWER ACTUATED ADJUSTABLE TIRE DEMOUNTING BAR

Aubrey Lowrey, Shreveport, La.

Application April 3, 1950, Serial No. 153,599

3 Claims. (Cl. 157—1.17)

1

This invention relates in general to a power actuated adjustable tire demounting bar particularly adapted for use in connection with heavy truck tires and the like.

Whereas the copending application of Lowrey and Morris, Serial No. 102,988, relates especially to a lock ring apparatus, the present invention more especially has to do with the removal of the pneumatic rubber tire from a wheel rim after the movable flange and the locking ring of such tire have been removed.

One important object of this invention is to provide a device of this character wherein those parts of the apparatus requiring manual adjustment will be so constructed as to be within the manual capacity of one man.

Another object of the invention is to provide a tire demounting stand wherein the supporting means for a rim and tire will lie close to the ground, again effecting a saving in manual labor.

It is well known that after a tire has been in use on a wheel rim for a considerable time the rubber of the tire adheres strongly to the rim and especially where it contacts the fixed flange of such a rim.

A further object of this invention is to provide a tire demounting device in which novel means are provided to break the adhesive between rubber and metal in an adhering tire.

A still further object of this invention is to provide adhesion breaking means for the foregoing purpose wherein the breaking means may be moved step-by-step around the tire.

With the above and other objects in view, as will be presently apparent, the invention consists in general of certain novel details of construction and combinations of parts hereinafter fully described, illustrated in the accompanying drawings and particularly claimed.

In the drawings, like characters of reference indicate like parts in the several views, and Figure 1 is a plan view if this invention and showing a partially broken away tire and a rim located on the stand;

Figure 2 is a section on the line 2—2 of Figure 1, and

Figure 3 is a detail section on the line 3—3 of Figure 2.

In the embodiment of the invention as shown in the drawings there is provided a cylinder 10 preferably mounted on short legs 11. This cylinder is integrally closed at its bottom. The upper end of the cylinder is closed by a head 12 secured in place by bolts 13. A gasket 14 rests on top of the cylinder wall and the head 12 seats on this gasket, thus rendering the cylinder fluid tight.

Within the cylinder is a piston including a lower head member 15 and an upper head member 16. The lower member 15 is provided at its upper edge with a rabbet 17, and an angled packing strip 18 surrounds the member 15 and has an internal flange resting in the rabbet. The upper member 16 is surrounded peripherally by a packing strip 19 having an internal flange underlying the member 16. Between the flanges of the packing strips 18 and 19 is fitted a gasket 20. Bolts 21, of which only one is shown, connect the members 15 and 16 and cause a compression of the packing strips so that a fluid tight joint is formed between the piston and the inner surface of the cylinder wall. Centrally of the member 16 is a boss 22 of sufficient height to prevent contact between the body of the member 16 and the head 12. This boss 22 has an opening 23 extending through its center. Centrally of the member 15 is an upwardly opening and threaded pocket 24. Screwed into this pocket is the lower end of a tubular piston rod 25 which extends upwardly through the boss 23. Centrally of the head 12 is a stuffing box 26 having the usual gland 27 and packing 28 and the rod 25 extends upwardly through this structure. Rotatably mounted in the hollow rod 25 is a swivel rod 29 having a head 30 on its lower end which rests against the lower end of the rod 25 in the pocket 24. At the upper end of the swivel rod 29 is formed an eye 31 to which is connected one end of a chain 32 having links of uniform shape and size. On the head 12 is formed a triad of short ribs 32 which radiate from the box 26 and have steps 33 on their upper edges. Also long ribs 34 are formed on the head 12 and project beyond the periphery of said head. These long ribs radiate from the box 26 and each has a single step or notch 35 at its outer end and a series of steps 36 at the portion adjacent the box 26. The steps 33 and 36 serve to support the hubs of wheels being handled on this device when desirable. Also the short ribs 32 and the long ribs 34 act to reinforce head 12. In the head 12 is formed a port 37 and the bottom of the cylinder has a port 38. These ports have pipes 39 connecting with a suitable control valve 40 the structure of which may be of commercial type and thus not necessary here to detail. The valve 40 is supplied with fluid under pressure as by the pipe 41 and may exhaust through a port 42. In one position of the valve fluid under pressure will be admitted above the piston and exhausted from below the piston while in another position of the valve the admission will be below and the exhaust above the piston.

The operating bar or lever consists of a structure having a pair of elongated sides 43 held in parallel spaced relation by integral cross pieces 44. At one end portion of this bar the sides 43 are provided with pairs of axially alined bolt openings 45 spaced longitudinally of the bar. On this end of the bar is adjustably mounted what is preferably termed a fulcrum member indicated in general at 46. This fulcrum member includes a sleeve 47 which fits on the bar neatly against the side faces thereof but which fits loosely relative to the top and bottom edges of the sides 43. Extending downwardly from this sleeve 47 is a rib 48 which projects at its ends beyond the sides of the sleeve. Extending transversely of each end of the rib 48 is a foot 49. In order to hold the fulcrum member 46 in adjusted position on the bar a bolt 50 passes through a selected pair of the openings 45 and through the sleeve 46. Extending downwardly from the cross-piece 44 adjacent the opposite end of the operating bar is a pusher blade 51 the lower portion of which curves toward the fulcrum member 46 and is tapered to present a somewhat knife-edge construction as at 52. A brace bar 53 extends from the curved portion 52 substantially in alinement to the knife-like edge and is secured between the sides 43 by a bolt 54.

Centrally of the length of the presser bar its sides 43 are provided on their upper edges with spaced notches 55, the notches in one side 43 being alined opposite those on the other side 43. Thus the presser bar is provided with pairs of notches spaced longitudinally of said bar. On the sides 43 is mounted a saddle indicated in general at 56. This saddle is a rectangular structure having side walls 57 and end walls 58. The side walls rest on the bar sides 43 and the end walls span the space between the bar sides. One of the end walls 58 is provided on its lower edge with a rounded edge 59 selectively engageable in the pairs of notches 55. Lugs 60 extend downwardly from the saddle 56 and engage against adjacent sides 43 of the presser bar to keep the saddle from moving sideways. Between the saddle sides 57 extends a U-shaped slotted chain grip 61 having its sides so spaced as to permit a link of the chain 32 to pass into the slot of the grip in one position and hold the chain links from passing down between the clamp sides.

In connection with the above described apparatus there has been shown in the drawings a wheel rim 62 having a tire 63 thereon, the tire having engagement with the fixed flange 64 of the wheel rim. Also, the removable flange 65 and locking rim 66 are shown, dotted or broken lines being used to indicate that the parts 65 and 66 have been removed. The rim 62 is shown as being of the largest size which can be carried by an apparatus of the comparative size indicated, but it will be understood that larger and smaller rims and wheel centers can be provided for without changing any structural arrangement but only by changing sizes and proportions.

As shown, the rim 62 is seated on the three steps 35. The presser bar or lever is then positioned so that the curved end 52 of the part 51 rests on the side of the tire 63, the knife edge of the curved end being positioned to enter the crack between the fixed flange 64 and the tire 63. The fulcrum member 46 is then adjusted in such manner that the forward ends of the feet 49 rest on the rim flange 64 while the rear ends of these feet rest on the side wall of the tire. The bolt 50 is then passed through the sides of the sleeve 47 and an appropriate pair of openings 45. Fluid having been applied to the cylinder 10 below the piston, the piston rod assumes its highest position. The saddle is now adjusted so that the chain grip lies closer to the part 51 than does the top of the swivel rod 29. The free end of the chain 32 is then passed up through the saddle, is drawn taut and engages in the chain grip. The chain will thus be inclined as in Figure 2. Upon pressure being brought on top of the piston the rod 25 will be retracted. This will not only pull the lever bar down but will cause it to move bodily towards the right of Figure 2 so that the knife edge of the part 51 is forced between the tire and the rim flange 64. The piston will now be raised, the attachment of the chain to the saddle shortened and the piston again depressed. This sequence of movements is kept up until the tire has been pushed completely off the rim, the presser bar being shifted around the rim and tire from time to time between the pushng steps.

While there is herein shown and described the preferred embodiment of the invention, it is nevertheless to be understood that minor changes may be made therein without departing from the spirit and scope of the invention as claimed.

What is claimed is:

1. In a demounting stand for pneumatic tires, a pneumatic cylinder having pressure actuated means therein, a piston rod extending upwardly from said means, supporting means carried by the upper end of said cylinder for supporting a wheel rim, a chain having one end connected to said piston rod, a presser bar forming a lever, a saddle mounted on the lever intermediate the ends thereof and having means for selectively engaging the links of said chain and being adjustable longitudinally of the lever, cooperating means on the saddle and lever for holding the saddle in adjusted position, a fulcrum device loosely and adjustably pivotally mounted on one end of the lever to permit rocking of the fulcrum device on the lever and a pusher device depending from the other end of said lever and including a rib extending downwardly from said lever with the lower end portion thereof curved toward the middle of the lever and tapered to form a knife edge.

2. A demounting stand as in claim 1, wherein the means for holding the saddle in adjusted position includes notches in the upper side of the lever and a cross pin on the saddle selectively receivable in the notches.

3. A demounting stand as in claim 1, wherein the fulcrum device includes a loose sleeve extending around the lever, said sleeve having aligned pin-receiving openings, a pin extended through said openings and through a selected one of a plurality of openings in said lever and a tire and rim engaging foot carried by the lower side of the sleeve.

AUBREY LOWREY.

References Cited in the file of this patent

UNITED STATES PATENTS

| Number | Name | Date |
|---|---|---|
| 1,124,316 | Pfleumer | Jan. 12, 1915 |
| 1,341,727 | Weaver | June 1, 1920 |
| 1,684,446 | Inglis | Sept. 18, 1928 |
| 2,163,469 | Raschka | June 20, 1939 |
| 2,436,003 | Goselin | Feb. 17, 1948 |
| 2,442,714 | Stack | June 1, 1948 |
| 2,455,580 | Hewitt | Dec. 7, 1948 |
| 2,512,864 | Koester | June 27, 1950 |
| 2,537,189 | King | Jan. 9, 1951 |